United States Patent [19]

Beck et al.

[11] Patent Number: 4,693,826

[45] Date of Patent: Sep. 15, 1987

[54] OVERFLOW FOR SLURRY TANK

[75] Inventors: Jeffrey L. Beck, Morgantown, W. Va.; David W. Campbell, Bethel Park, Pa.

[73] Assignee: Conoco Inc., Ponca City, Okla.

[21] Appl. No.: 830,037

[22] Filed: Feb. 18, 1986

[51] Int. Cl.⁴ ............................................. E01D 45/12
[52] U.S. Cl. ............................. 210/512.1; 210/532.1; 210/540
[58] Field of Search ...................... 210/512.1, 304, 787, 210/788, 513, 519, 532.1, 532.2, 537, 538, 540, 541, 542; 209/144, 211

[56] References Cited

U.S. PATENT DOCUMENTS 1,822,021  9/1931  Fuqua .................................... 210/304

Primary Examiner—Frank Sever
Attorney, Agent, or Firm—Cortlan R. Schupbach

[57] ABSTRACT

This invention describes an overflow system for a slurry storage chamber which chamber has a slurry input pipe tangentially mounted through a side wall of the tank to create a vortex. The overflow portion is designed to have a pressure confining top to the tank with the overflow pipe connected near the center of the top. A conically shaped baffle is inserted in the tank with its axis aligned with the axis of the overflow pipe and positioned immediately below the overflow pipe. The overflow configuration provides a means for separating the particles from the fluids passing out through the overflow pipe.

4 Claims, 4 Drawing Figures 4,693,826

OVERFLOW FOR SLURRY TANK

BRIEF DESCRIPTION OF THE INVENTION

This invention relates to a tank used for confining slurry and principally for temporary storage of slurry and is formed from a substantially cylindrical side wall and bottom. The slurry input is tangentially mounted through the side wall near the top of the tank. The overflow is uniquely configured such that the tank has a pressure confining top with an overflow pipe connected near the center. Directly below the overflow pipe is a conically shaped baffle which has its apex pointing toward the overflow pipe. The baffle is suspended or positioned away from the overflow pipe by any means. As fluid leaving the tank moves toward the overflow pipe, the rotational velocity imparted by the tangential inlet flow is amplified as the radius of rotation decreased due to the principle of conservation of angular momentum. There is also an increase in the inward radial component of velocity as the cross-sectional area gradually decreases. As a consequence, larger particles will be propelled by centrifugal force toward the cylindrical side wall top of the tank and due to gravity drop toward the bottom of the tank. Since the larger particles are kept from reaching the overflow pipe and tend to settle toward the bottom of the tank, only fluid and some small particles pass out of the overflow.

BRIEF DESCRIPTION OF THE PRIOR ART

One form of slurry input device is illustrated in U.S. Pat. No. 4,541,850 by Oda and Sweeney, entitled "Slurry Input Device". This Patent discloses a cylindrical input system with an output system adapted to drop the material from the input by gravity through a conical output system which has apparatus in the conical output system to destroy the circular flow of the material coming into the slurry storage system. This Patent differs substantially from the above referenced Application.

Another U.S. Pat. No. 2,010,435 to Matheson discloses a vortex with its inlet above a conically shaped baffle. Such a baffle is used to separate the upper vortex from the lower chamber to reduce the turbulence effect in the lower chamber.

BRIEF DESCRIPTION OF THE INVENTION

This invention describes a slurry storage chamber which does not separate the vortex input from the lower portion of the tank as disclosed in the above referenced Application to Matheson, but rather inputs slurry tangentially through a side wall of the tank to create a vortex. The overflow from the tank is at the top of the tank. The overflow portion of the tank is designed to have a pressure confining top to the tank with the overflow pipe connected near the center of the top. A conically shaped baffle is inserted in the tank with its axis aligned with the overflow pipe axis and positioned below the overflow pipe.

The upper portion of the tank operates by amplifying the rotational velocity imparted by the tangential slurry input so that the larger particles in the slurry entering the tank remain near the side wall and settle downward due to gravity while the fluid and some small particles follow a spiral path to the overflow pipe where they exit. The particles that settle downward form a bed in the bottom portion of the tank where they may remain in storage or be reclaimed by a bottom reclaim method such as the one disclosed in U.S. Pat. No. 4,541,850 issued to Ronald L. Oda and William T. Sweeney and assigned to the same Assignee as this invention. Near the inner surface of the top of the tank and near the top side of the conically shaped baffle the rotational velocity is reduced by the drag of viscous shear forces between the moving fluid and these stationary surfaces. This reduced rotational velocity results in reduced centrifugal forces causing particles to be thrown toward the side wall with less force. The use of a conical baffle results in the particles near the surface of the baffle being thrown back out into the rapidly rotating flow further away from the baffle where they are then thrown toward the cylindrical side wall of the tank and settle downward into the bottom portion of the tank. The separation of particles from the overflow fluids can be improved by using a conical top on the tank with the apex of the cone pointed downward and with the overflow pipe connected at the apex of the cone.

DETAILED DESCRIPTION OF THE INVENTION

Figure 2:
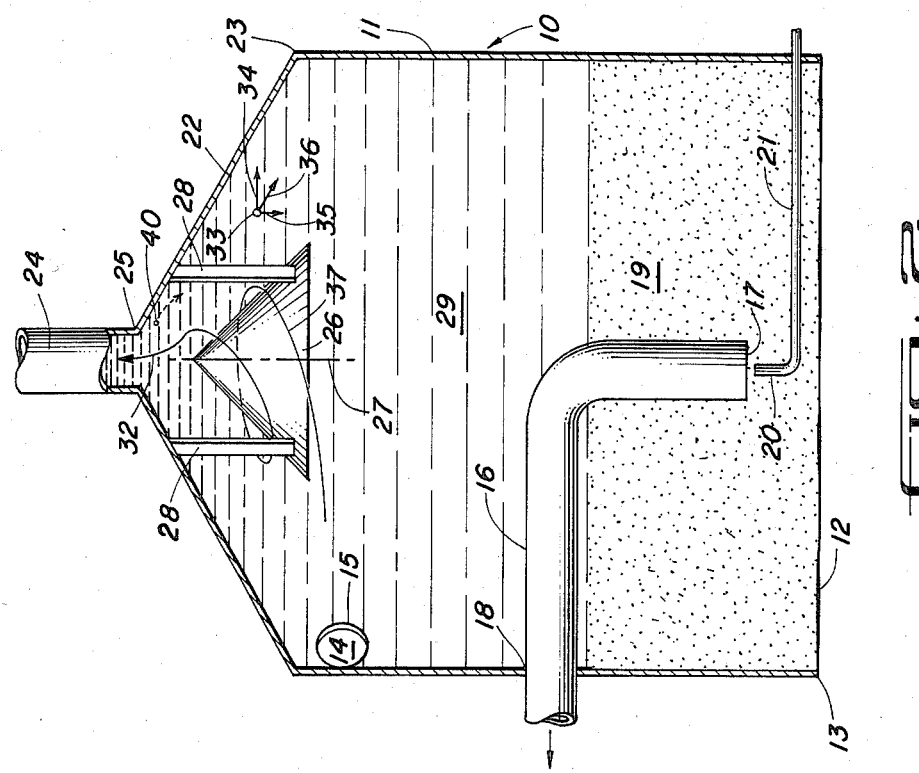
FIG. 2 is a cross-sectional view of the tank taken through 2—2 in FIG. 1 with the conical baffle shown in full view.
Figure 1:
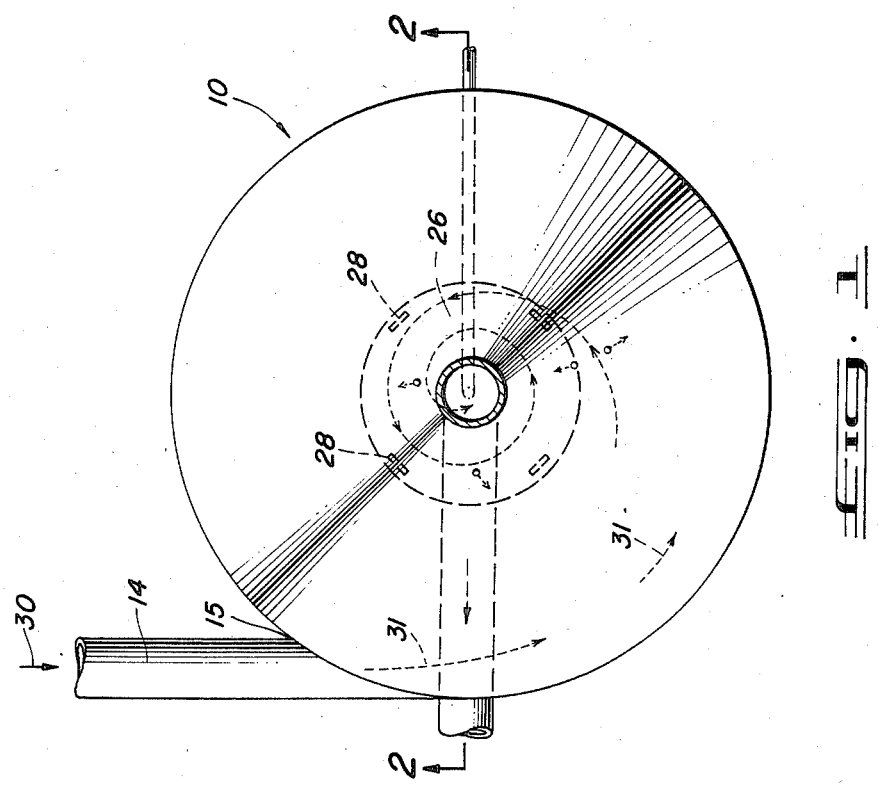
FIG. 1 is a top view of a tank showing the tangential input and the modified overflow output.

Referring to all of the drawings, but in particular to FIGS. 1 and 2, a tank generally referred to by arrow 10 has a substantially cylindrical side wall 11 and a bottom 12 attached to the bottom of side wall 11 along edge 13. Tank 10 can be made of any usable material such as steel or concrete as the need may be.

A slurry input pipe 14 is tangentially mounted through wall 11 and attached or welded along seam 15.

Material is removed from the tank in any manner desired by the user. One method is to have an output pipe 16 with a downwardly facing mouth 17. Pipe 16 passes through side wall 11 at a point 18 and is attached in any usual manner such as welding or flanging. Pipe 16 will normally be connected to a slurry pump which is not illustrated.

In order to facilitate removal of a bed of slurry 19, a jet 20 is mounted below mouth 17 and connected to a pipe 21 which is subsequently connected to a high pressure pump, not illustrated. The preferred method for removing the slurry is illustrated in U.S. Pat. No. 4,541,850, previously referenced.

The overflow system which is the subject of this invention, essentially comprises a pressure confining top 22, illustrated as conical in FIGS. 1 and 2, having its outer periphery attached around the upper edge 23 of side wall 11. An overflow pipe 24 is attached at the center 25 of top 22. A conical baffle 26 is positioned directly below the outlet pipe in a manner so that the axis of conical baffle 26 and outlet pipe 24 substantially coincide. Conical baffle 26 is attached in any usual manner such as braces 28.

In addition to slurry 19, tank 10 is filled with a fluid 29. Normally, in the case of a slurry, the fluid is water, while the particulate matter is coal, however, the particulate could be any particulate matter such as phosphate, rock, clay or any other material.

Figure 3:
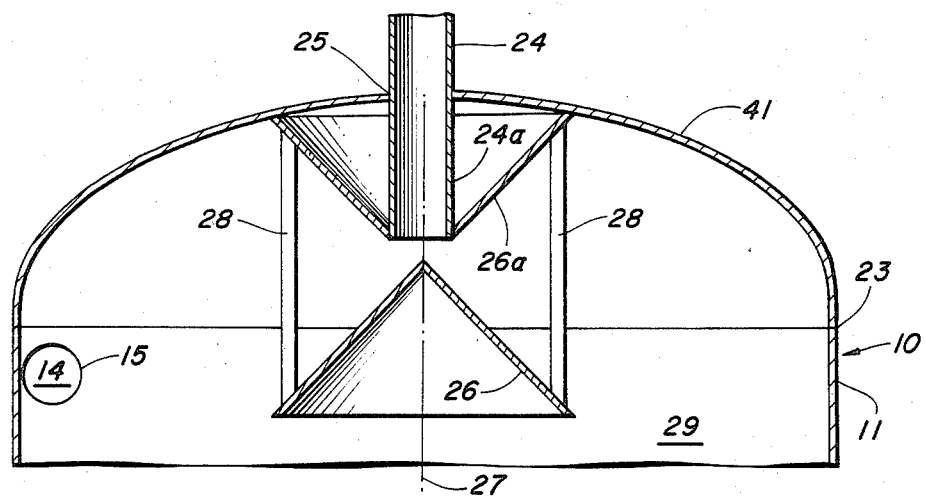
FIG. 3 is a cross-sectional view of one modification of the overflow apparatus illustrated in FIGS. 1 and 2; and, FIG. 4 is a further modification of the overflow apparatus illustrated in FIGS. 1 and 2.
Figure 4:
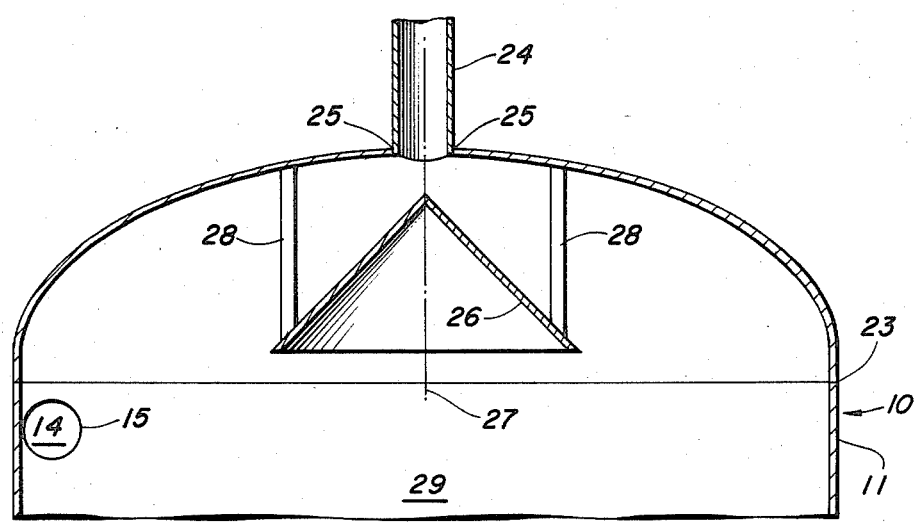

Referring to FIGS. 3 and 4, additional embodiments of the invention described in FIGS. 1 and 2 are illustrated. In these FIGURES, identical parts will carry identical numbers. Referring in particular to FIG. 3, tank 10, rahter than a conical top, as illustrated in FIGS. 1 and 2, has a dome shaped top 41. Outlet pipe 24 extends into the interior of the tank through an extension 24a with an additional upper baffle 26a. The remaining elements of the outlet apparatus are identical to that described in FIGS. 1 and 2. Referring to FIG. 4, outlet pipe 24 terminates at the attachment point 25, as illustrated in FIGS. 1 and 2. However, the top is configured with a dome shaped configuration substantially like that shown in FIG. 3.

OPERATION

Referring in particular to FIGS. 1 and 2, the overflow system operates in the following manner: Slurry is inputted along the direction of arrow 30 into pipe 14 and exits in the direction of arrow 31, tangentially around the outer wall 11 of tank 10. The heavier material will settle to the particulate bed 19 where it will be eventually removed by fluid entering pipe 21 into mouth 17 where it will be pumped from pipe 16 to a system for disposing of the slurry (such system is not illustrated in this Application). Such a system could be, however, a processing plant in the case of a coal slurry, as an example.

One of the problems with any normal storage system, such as illustrated in tank 10, is the removal of particulate matter along with the removal of overflow slurry. In order to accommodate an overflow which does not transfer a disproportionate amount of large particulate into the overflow which subsequently must be disposed of in some manner an unique output system is disclosed which includes a pressure confining top such as conical top 22 and baffle 26 in cooperation with overflow pipe 24. As the tank becomes filled with fluids, the excess fluids will begin flowing out of the overflow pipe 24. As previously discussed, one of the problems with the fluid moving out of overflow pipe 24 is the possibility of large particulate matter being carried with the overflow fluids. The apparatus illustrated in this invention prevents the overflow of large particulate matter in the following manner: The upper portion of the tank operates by amplifying the rotational velocity imparted by the tangential slurry input from pipe 14, so that the larger particulate matter in the slurry entering the tank, as illustrated by number 33 on FIG. 2, remain near the side wall and settle down due to gravity, while the fluid and some smaller particles follow a spiral path 37 to the overflow pipe 24 where they exit. The particles that settle downward form bed 19 which will be removed as necessary by fluids being imparted into pipe 21 and exiting jet 20 which will force the particulate matter from bed 19 into the inlet 17 of pipe 16 where the particulate matter will exit the tank and be further disposed at some remote location, such as a processing plant. One bottom reclaim method has been previously discussed as U.S. Pat. No. 4,541,850 which shows a complete reclaim method for a tank, as above illustrated.

Near the surface of the top of the tank and near the top side of the conically shaped baffle the rotational velocity is reduced by the drag of viscous shear forces between the moving fluid and the stationary surfaces, such as the interior surface of conical top 22. This reduced rotational velocity results in reduced centrifugal forces, as illustrated by arrow 34, causing particle 33 to be thrown toward the side wall with less force. The use of a conical baffle results in the particles near the surface of the baffle being thrown back out into the rapidly rotating flow further away from the baffle where they are then thrown toward the cylindrical side wall of the tank where the particles will settle downward into the particulate bed 19 of the tank. The separation of particles from the overflow fluids can be improved by using an additional upper baffle 26a as illustrated in FIG. 3, however, the invention is not so limited as to be operable only with an additional upper baffle.

The top configuration illustrated in FIGURES 1, 2 and 4 are clearly within the embodiments of the invention. Basically the top 22 must be a pressurized top with overflow pipe 24 at the center of top 22 and the conical baffle 26 positioned below the outlet in order for the invention to properly function.

A tank constructed without the conical baffle 26, was operated and was found that particles as large as one-half inch were passing out of overflow 26. The baffle was then installed. A sample of coal passing out of the overflow was collected and analyzed. Virtually all of the coal passed through a thirty mesh screen and less than one percent of the coal was retained on a fifty mesh screen. These results were obtained while approximately three hundred gallons per minute were passing through a 1,300 gallon tank that was about half full of coal.

CONCLUSIONS

An unique slurry overflow system for a temporary storage tank has been disclosed which essentially provides a means for preventing a substantial amount of large particulate matter from entering the overflow which then must be subsequently reprocessed in order to again remove the particulate matter from the overflow system.

A tank constructed in accordance with this invention will retain substantially all of the course particulate matter in the tank.

It is obvious that other modifications and changes can be made using the teachings of this invention as described in the specification and appended claims and still be within the spirit and scope of this invention as described in the appended claims.

What I claim is:

1. A tank comprising: means for confining slurry which is comprised of fluid and particles of various sizes, said tank having a cylindrical side wall having a substantially vertical axis and an upper and lower edge, a bottom attached to said side wall at its lower edge along its periphery and an inlet tangentially mounted into said side wall between said lower and said upper edge of said cylindrical side wall; an outlet for said tank including, means enabling slurry entering tangentially into said tank to have a rotational force generated around the axis of said tank so that slurry moving toward said outlet pipe between an inner cone and said pressure confining top will have its velocity gradually increased causing particles to be deflected toward said cylindrical side wall and toward the bottom of said tank. Consisting essentially of a pressure confining top attached to said upper edge, an outlet pipe mounted near the center of said top and said inner cone, means for mounting said inner cone coaxial with said pressure confining top, said inner cone having a base diameter less than the diameter of said pressure confining top.

2. Apparatus as described in claim 1 wherein said pressure confining top comprises a conical top having its outer periphery attached to the outer periphery of said cylindrical side wall and said outlet pipe mounted through the apex of said conical top.

3. Apparatus as described in claim 1 wherein said pressure confining top is a dome shaped top having an outer periphery attached to the outer periphery of said cylindrical side wall and said outlet pipe mounted near the center of said dome shaped top.

4. Apparatus as described in claim 3 wherein said outlet pipe is extended into said tank and wherein the apex of second conically shaped baffle means is attached between the terminus of said overflow pipe extensions and said pressure confining top.

* * * * *